(12) United States Patent
Chen et al.

(10) Patent No.: US 12,743,090 B2
(45) Date of Patent: Sep. 22, 2026

(54) DRONE MONITORING AND CONTROL SYSTEM

(71) Applicant: INDUSTRIAL TECHNOLOGY RESEARCH INSTITUTE, Hsinchu (TW)

(72) Inventors: Yi-Yuan Chen, Taoyuan City (TW); Cheng-Hsuan Lin, Taoyuan City (TW); Hsin-Tien Yeh, Taichung City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 106 days.

(21) Appl. No.: 18/618,859

(22) Filed: Mar. 27, 2024

(65) Prior Publication Data

US 2024/0329646 A1 Oct. 3, 2024

Related U.S. Application Data

(60) Provisional application No. 63/454,857, filed on Mar. 27, 2023.

(51) Int. Cl.
*G05D 1/224* (2024.01)
*G05D 1/646* (2024.01)
(Continued)

(52) U.S. Cl.
CPC ........... *G05D 1/2247* (2024.01); *G05D 1/646* (2024.01); *G06T 3/4038* (2013.01); *G06T 7/70* (2017.01);
(Continued)

(58) Field of Classification Search
CPC ...... G05D 1/2247; G05D 1/646; G05D 1/225; G05D 2105/10; G05D 1/689;
(Continued)

(56) References Cited

U.S. PATENT DOCUMENTS 8,515,593 B2 8/2013 Marty et al.
9,387,928 B1 7/2016 Gentry et al.
(Continued)

FOREIGN PATENT DOCUMENTS

CN 106547280 A * 3/2017 ............... B64D 1/18
CN 109247324 A * 1/2019 .......... A01M 7/0089
(Continued)

OTHER PUBLICATIONS

Machine translation of CN-106547280-A (Year: 2017).*
(Continued)

*Primary Examiner* — Navid Z. Mehdizadeh
*Assistant Examiner* — Caitlin R McCleary
(74) *Attorney, Agent, or Firm* — Maschoff Brennan

(57) ABSTRACT

A drone monitoring and control system includes: a drone, a mobile vehicle configured to carry the drone, a computing device and a display device. The drone is disposed with an operation payload and a camera. The drone performs an output operation of the operation payload. The computing device outputs a first environment image according to a first image captured by the camera, generates a flight trajectory of the drone and a movement trajectory of the mobile vehicle according to an operation data set including a target location of a target object and 3D terrain data, controls the drone to move to a set location according to the flight trajectory, and controls the drone to stay at the set location when a distance between the target and set locations is less than a preset distance. The display device displays the first environment image and the 3D terrain data.

10 Claims, 6 Drawing Sheets

(51) Int. Cl.
*G06T 3/4038* (2024.01)
*G06T 7/70* (2017.01)
*G06V 10/00* (2022.01)

(52) U.S. Cl.
CPC .......... *G06V 10/00* (2022.01); *G06V 2201/07* (2022.01)

(58) Field of Classification Search
CPC ............ G05D 1/6987; G05D 2109/254; G06T 3/4038; G06T 7/70; G06V 10/00; G06V 2201/07; G06V 20/17
See application file for complete search history.

(56) References Cited

U.S. PATENT DOCUMENTS

| | | | | |
|---|---|---|---|---|
| 10,198,003 | B2 | 2/2019 | Sabe et al. | |
| 11,377,210 | B2 | 7/2022 | Fujimoto | |
| 11,472,552 | B2 | 10/2022 | Gil et al. | |
| 11,857,987 | B1 * | 1/2024 | Stolarz | B05B 12/122 |
| 2015/0367957 | A1 * | 12/2015 | Uskert | H04N 23/90 348/144 |
| 2018/0157253 | A1 | 6/2018 | Margolin et al. | |
| 2018/0189971 | A1 * | 7/2018 | Hildreth | G06T 7/13 |
| 2019/0394695 | A1 * | 12/2019 | Mueck | G05D 1/0022 |
| 2020/0317340 | A1 | 10/2020 | Gil et al. | |
| 2020/0327688 | A1 | 10/2020 | Hsieh et al. | |
| 2020/0398985 | A1 * | 12/2020 | Hsu | G08G 1/096827 |
| 2021/0012520 | A1 * | 1/2021 | Zhou | G05D 1/0038 |
| 2022/0023904 | A1 * | 1/2022 | Chapple | B05B 12/12 |
| 2022/0100208 | A1 * | 3/2022 | Karbasi | B60L 50/60 |
| 2023/0243620 | A1 * | 8/2023 | Hamer | F41G 3/04 89/1.11 |

FOREIGN PATENT DOCUMENTS

| | | | | | |
|---|---|---|---|---|---|
| CN | 110371294 | A | * | 10/2019 | B64D 1/18 |
| CN | 111813148 | A | | 10/2020 | |
| CN | 211617535 | U | | 10/2020 | |
| CN | 113379940 | A | | 9/2021 | |
| CN | 114408200 | A | | 4/2022 | |
| CN | 115202391 | A | | 10/2022 | |
| CN | 115783290 | A | | 3/2023 | |
| JP | 2015-207149 | A | | 11/2015 | |
| JP | 2016-082441 | A | | 5/2016 | |
| JP | 2017-119477 | A | | 7/2017 | |
| JP | 2019-169863 | A | | 10/2019 | |
| JP | 2022-107078 | A | | 7/2022 | |
| JP | 2023-040726 | A | | 3/2023 | |
| WO | 2018/150917 | A1 | | 8/2018 | |
| WO | WO-2020162584 | A1 | * | 8/2020 | G08G 5/00 |

OTHER PUBLICATIONS

Machine translation of CN-109247324-A (Year: 2019).*
Machine translation of CN-110371294-A (Year: 2019).*
Machine translation of WO-2020162584-A1 (Year: 2020).*
JP Office Action dated May 27, 2025 as received in Application No. 2024-051644.
Kang, Y. et al., "Software Design for Mini-type Ground Control Station of UAV," The Ninth International Conference on Electronic Measurement & Instruments, pp. 4-737-4-740 (2009).
Lizarraga, M. et al., "SLUGS UAV: A Flexible and Versatile Hardware/Software Platform for Guidance Navigation and Control Research," 2013 American Control Conference (ACC), pp. 674-679 (Jun. 17-19, 2013).
Baktiyar, A. et al., "Remote Monitoring of Outdoor High Voltage Insulator using Deep Learning-based Image Processing," 2021 IEEE International Conference on Environment and Electrical Engineering and 2021 IEEE Industrial and Commercial Power Systems Europe (EEEIC / I&CPS Europe), (2021).
TW Office Action dated Dec. 9, 2024 in application 113111448.

* cited by examiner

DRONE MONITORING AND CONTROL SYSTEM

CROSS-REFERENCE TO RELATED APPLICATIONS

This non-provisional application claims priority under 35 U.S.C. § 119(a) on Patent Application No(s). 63/454,857 filed in US on Mar. 27, 2023, the entire contents of which are hereby incorporated by reference.

BACKGROUND

1. Technical Field

The present disclosure relates to a drone monitoring and control system.

2. Related Art

Due to the presence of moisture, salt, and dust in the air, dirt is easily attached to the surfaces of various equipment, such as high-voltage power towers, wind turbine blades, or high-rise glass.

SUMMARY

A drone monitoring and control system according to an embodiment of the present disclosure includes: at least one drone, at least one mobile vehicle, a computing device and a display device. The at least one drone is disposed with an operation payload and at least one camera, the at least one camera is configured to capture a first image, and the at least one drone is configured to perform an output operation of the operation payload. The at least one mobile vehicle is configured to carry the at least one drone. The computing device is connected to the at least one drone, the computing device is configured to output a first environment image according to the first image captured by the at least one camera, and generate a flight trajectory of the at least one drone and a movement trajectory of the at least one mobile vehicle according to an operation data set corresponding to the output operation, wherein the operation data set comprises a target location of a target object and three-dimensional terrain data of the target location, the computing device is further configured to control the at least one drone to move to a set location according to the flight trajectory, and control the at least one drone to stay at the set location when a distance between the target location and the set location is less than a preset distance. The display device is connected to the computing device, the display device is configured to display the first environment image and the three-dimensional terrain data.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
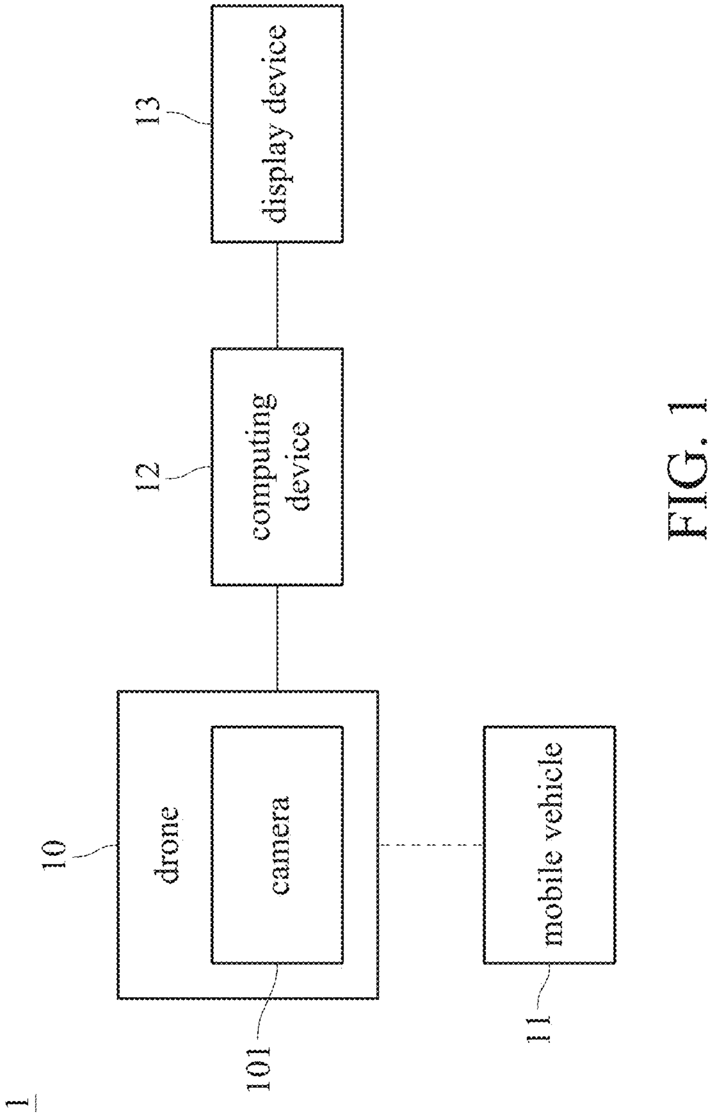
FIG. 1 is a block diagram illustrating a drone monitoring and control system according to an embodiment of the present disclosure.

Please refer to FIG. 1, wherein FIG. 1 is a block diagram illustrating a drone monitoring and control system according to an embodiment of the present disclosure. As shown in FIG. 1, the drone monitoring and control system 1 includes at least one drone 10, at least one mobile vehicle 11, a computing device 12 and a display device 13. The computing device 12 is connected to the drone 10 and the display device 13.

The drone 10 is disposed with an operation payload and at least one camera 101. The camera 101 is configured to capture a first image. The camera 101 may be an omnidirectional camera, and the omnidirectional image (the first image) captured by the camera 101 may be used as the first environment image; or, there may be more than one camera 101, and the images (the first images) captured by the cameras at different directions may be spliced into the first environment image. The drone 10 is configured to perform an output operation of the operation payload. When the drone monitoring and control system 1 is used for high-altitude cleaning operation, the operation payload may include liquid such as water or cleaning solution; or compressed air or electrical energy storage device; when the drone monitoring and control system 1 is used for derusting high tower, the operation payload may include rust removal paint or electrical energy storage device for laser rust removal. The present disclosure does not limit the content of the operation payload. The output operation may include spraying water, cleaning fluid, rust-removing paint or air jet on the target object, irradiating directional electromagnetic wave energy (such as laser), sound wave energy, etc. to the target object. The target object may include electrical towers (such as tension support-type electric tower and suspension-type electric tower), windmills, high towers, high-rise buildings and solar panels, etc. Further, the target object may include insulator on the electric tower, the blades of windmill, the glass of tower and high-rise building etc.

The mobile vehicle 11 may have a landing platform configured to support the drone 10. In other words, the mobile vehicle 11 may carry the drone 10 to deliver the drone 10 to a set location, and then the drone 10 performs the output operation of the operation payload. The set location may be a location of the drone 10 performing the output operation, and the set location may be located between a default takeoff location of the drone 10 and a target location described below. The mobile vehicle 11 may include one or more of a car, a boat, an airship, a bicycle and a motorcycle.

The computing device 12 is configured to output the first environment image according to the first image captured by the camera 101, wherein the computing device 12 may spliced multiple first images captured by the camera 101 into the first environment image. The computing device 12 generates a flight trajectory of the drone 10 and a movement trajectory of the mobile vehicle 11 according to an operation data set corresponding to the output operation, wherein the operation data set includes the target location of the target object and three-dimensional terrain data of the target location. The number of the target object may be one or more than one, the present disclosure is not limited thereto. The computing device 12 may perform at least one of the particle swarm optimization (PSO) algorithm, the genetic algorithm and the ant colony optimization (ACO) algorithm on the operation data set to generate the flight trajectory and the movement trajectory.

For example, the target object is an electrical tower, the output operation is cleaning the electrical tower, the target location includes coordinates (for example, latitude and longitude etc.) of the electrical tower, the three-dimensional terrain data includes altitude of the target location, height of the target object and height of surrounding obstacles etc., the flight trajectory may include a trajectory of the drone 10 flying from the default takeoff location described above to the target location, the movement trajectory may include a trajectory of the mobile vehicle 11 moving from a current location to the default takeoff location, and a distance between the default takeoff location and the target location is not greater than a first preset distance.

The computing device 12 is further configured to control the drone 10 to move to the set location according to the flight trajectory, and control the drone 10 to stay at the set location when the distance between the target location and the set location is smaller than a second preset distance. The computing device 12 may be further configured to control the drone 10 to perform the output operation after controlling the drone 10 to stay at the set location. In other words, when the drone 10 stays at the set location, the drone 10 may start performing the output operation. When the camera 101 is a depth camera, the computing device 12 may use the camera 101 to calculate a distance between the drone 10 and the target object; when the camera 101 is not a depth camera, the computing device 12 may perform image recognition on the first image captured by the camera 101 to obtain image of the target object, and determine the distance between the target location and the set location according to the image of the target object and a reference size (actual size) of the target object. For example, the computing device 12 may calculate a reduction ratio according to the size of the target object in the image and the reference size of the target object, and determine the distance between the target location and the set location according to the reduction ratio. The set location may be a destination of the flight trajectory, and a starting point of the flight trajectory may be a destination of the movement trajectory of the mobile vehicle 11 (i.e. the default takeoff location).

When the height of the target object is not smaller than a preset height, the first preset distance may be equal to or greater than a second preset distance, and the second preset distance may be smaller than the height of the target object. When the height of the target object is smaller than the preset height, the first preset distance may be equal to or smaller than the second preset distance, and the second preset distance may not be smaller than the height of the target object. For example, when the target object is an electrical tower, the height of the target object is not smaller than the preset height; when the target object is a solar panel, the height of the target object is smaller than the preset height. The preset height may be 50 meters, the first preset distance may be 40 meters, the second preset distance may be 2 meters to 3 meters. The values of the heights and preset distances described herein are merely examples, the present disclosure is not limited thereto.

The computing device 12 may be disposed in the mobile vehicle 11, the computing device 12 may also be a cloud computing device. The computing device 12 may include one or more processors, the processor is, for example, a central processing unit, a graphics processing unit, a microcontroller, a programmable logic controller or any other processor with signal processing function.

The display device 13 receives the first environment image and the three-dimensional terrain data output by the computing device 12, and displays the first environment image and the three-dimensional terrain data. The three-dimensional terrain data displayed by the display device 13 may include one or more of text, numbers and terrain patterns. The computing device 12 may connect to a server such as the Meteorological Bureau or other environmental observation station to obtain a current wind speed, a current wind direction, a current temperature and a current light direction at the target location. In addition, the display device 13 may be further configured to display the distance between the target location and the set location, the current wind speed at the target location, the current wind direction at the target location, the current temperature at the target location, the current light direction at the target location, the remaining operation payload of the drone and the remaining power of the drone. In an embodiment, the display device 13 may be at least one or multiple flat panel monitor, curved monitor, projector, head mounted display device or combination of the above.

Though the drone monitoring and control system according to one or more embodiments of the present disclosure, the work efficiency may be improved and manpower may be reduced.

In an embodiment, the operation data set may further include at least one of a type of the target object, a plurality of candidate parking locations of the mobile vehicle 11, an available flight duration of the drone 10, a current wind direction and a current wind speed at the target location and a default operation duration of the target object. The computing device 12 may use one of the candidate parking locations that is the closest to the target location as the default takeoff location. In addition, the operation data set may further include locations of the objects that are the same type as the target object in an operation range (for example, a range having the target location as a center and the second preset distance as the radius), types of said objects (for example, voltage type, number of insulators, number of insulator strings and the hanging method of the insulators, etc.) and estimated operation duration of the output operation etc. The computing device 12 may further generate at least one of an operation process of the drone 10 corresponding to the output operation, a shortest flight duration of the drone 10, the default takeoff location and the default landing location of the drone 10, replenishment timing of the operation payload, charging time of the drone 10 and number of charging cycles of the drone 10 according to the operation data set, wherein the computing device 12 may perform at least one of the particle swarm optimization algorithm, the genetic algorithm and the ant colony optimization algorithm on the operation data set to generate data such as the operation process described above.

Accordingly, the drone monitoring and control system may plan the output operation based on the spatial information of the output operation, the target location and the durability of the drone, including planning the drone's flight trajectory, number of flights, replenishment timing of the operating payload and number of times of replacing battery, etc.

In an embodiment, the computing device 12 may control the camera 101 to capture a second image before controlling the drone 10 to perform the output operation, control the camera 101 to capture a third image after controlling the drone 10 to perform the output operation, and compare the second image and the third image to determine a cleanliness level of the target object. Specifically, the computing device 12 may compare multiple blocks in the second image and multiple corresponding blocks in the third image to determine the cleanliness level. Or, the computing device 12 may learn the classification of clean and unclean target object images through color feature values and scale-invariant feature transform (SIFT) feature value algorithms, and then determine the corresponding cleanliness level of the third image.

Figure 2:
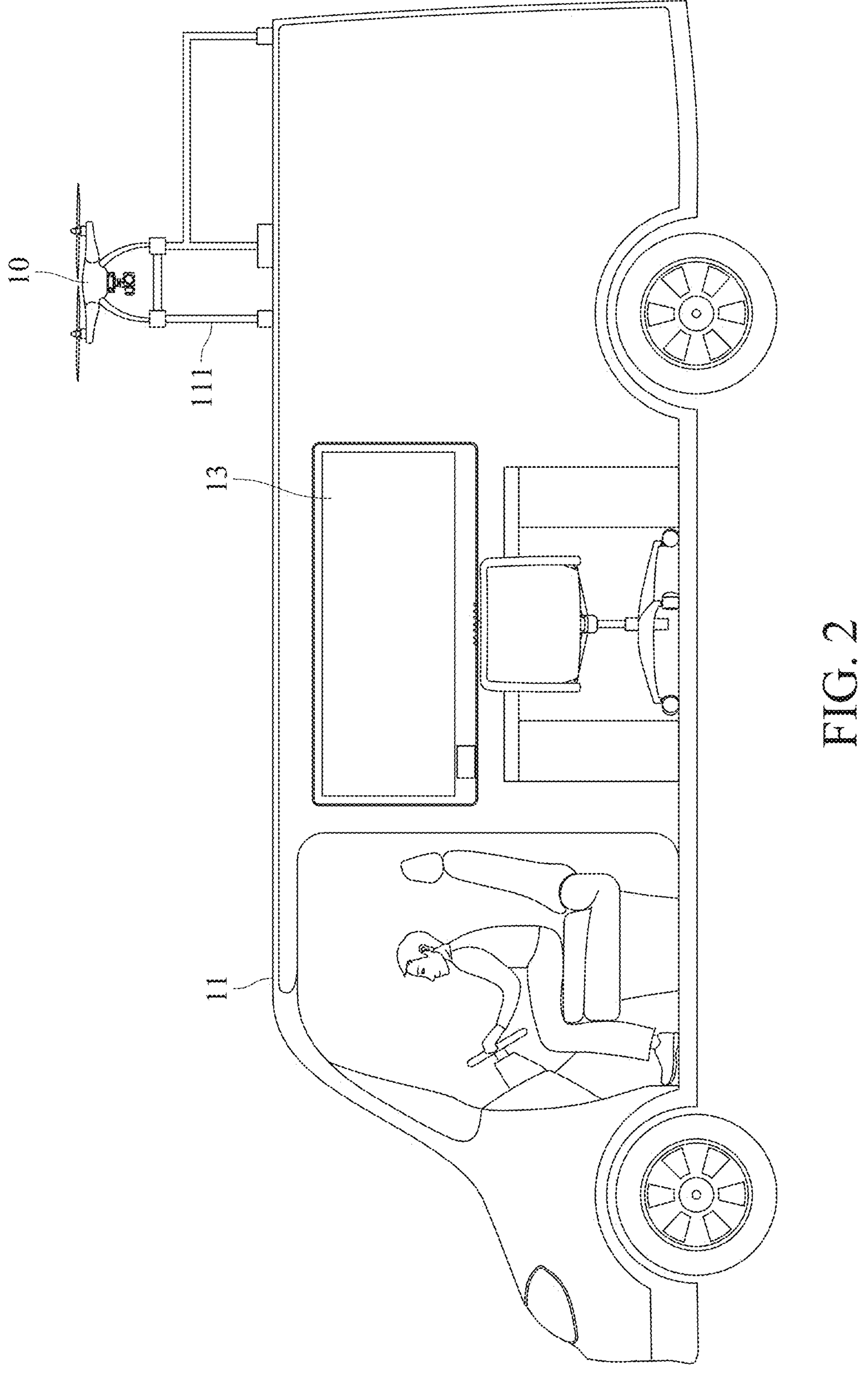
FIG. 2 is a schematic diagram illustrating a drone monitoring and control system according to an embodiment of the present disclosure.

Please refer to FIG. 1 and FIG. 2, wherein FIG. 2 is a schematic diagram illustrating a drone monitoring and control system according to an embodiment of the present disclosure. FIG. 2 illustrates an exemplary schematic diagram corresponding to FIG. 1. As shown in FIG. 2, the mobile vehicle 11 may include a landing platform 111 configured to carry the drone 10, and the display device 13 is disposed inside the mobile vehicle 11. In the example of FIG. 2, the computing device 12 is a cloud computing device, but the computing device 12 may also be disposed inside the mobile vehicle 11, the present disclosure is not limited thereto.

In addition, the drone monitoring and control system may further include a supply chamber disposed inside the mobile vehicle 11. The supply chamber may be equipped with the operation payload. Therefore, when the drone 10 parks on the landing platform 111, the operation payload of the drone 10 may be refilled.

Figure 3:
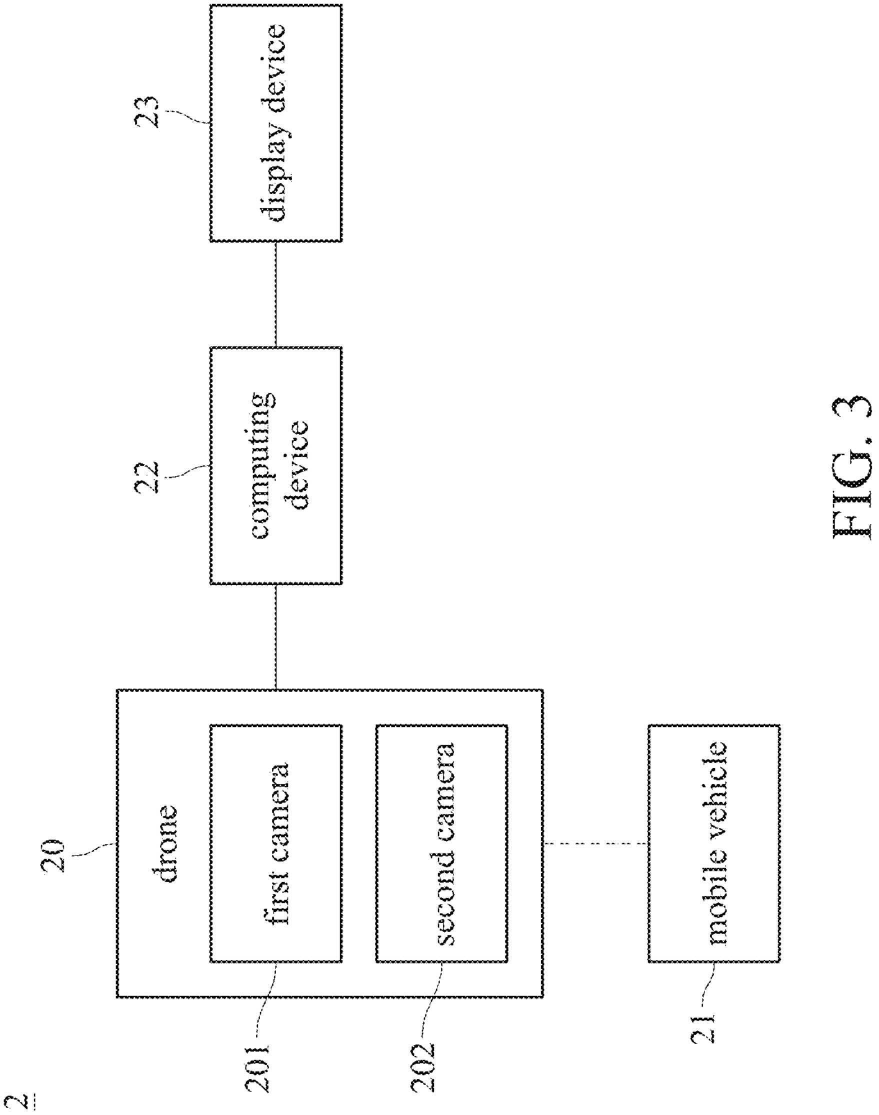
FIG. 3 is a block diagram illustrating a drone monitoring and control system according to another embodiment of the present disclosure.

Please refer to FIG. 3, wherein FIG. 3 is a block diagram illustrating a drone monitoring and control system according to another embodiment of the present disclosure. As shown in FIG. 3, the drone monitoring and control system 2 includes at least one drone 20, at least one mobile vehicle 21, a computing device 22 and a display device 23. The computing device 22 is connected to the drone 20 and the display device 23. The mobile vehicle 21, the computing device 22 and the display device 23 may be the same as the mobile vehicle 11, the computing device 12 and the display device 13 shown in FIG. 1 and FIG. 2, respectively, their details are not repeated herein.

The drone 20 includes a first camera 201 and a second camera 202. The first camera 201 and the second camera 202 are connected to the computing device 22. The first camera 201 and the second camera 202 are disposed at different locations of the drone 20, respectively. The first camera 201 and the second camera 202 are configured to obtain a plurality of initial images. The computing device 22 is further configured to use the initial images with different fields of view to generate the first environment image. In other words, the first camera 201 may be configured to obtain the first initial image, and the second camera 202 may be configured to obtain the second initial image. The computing device 22 may perform image tracking algorithm on the first initial image and the second initial image to determine at least one of the target object and the drone 20 in the first initial image and the second initial image, and then stitch the first initial image and the second initial image into the first environment image.

It should be noted that the number of the cameras shown in FIG. 3 is merely an example, the number of cameras on the drone may be more than two, the present disclosure is not limited thereto.

Figures 4A, 4B, 4C, 4D:
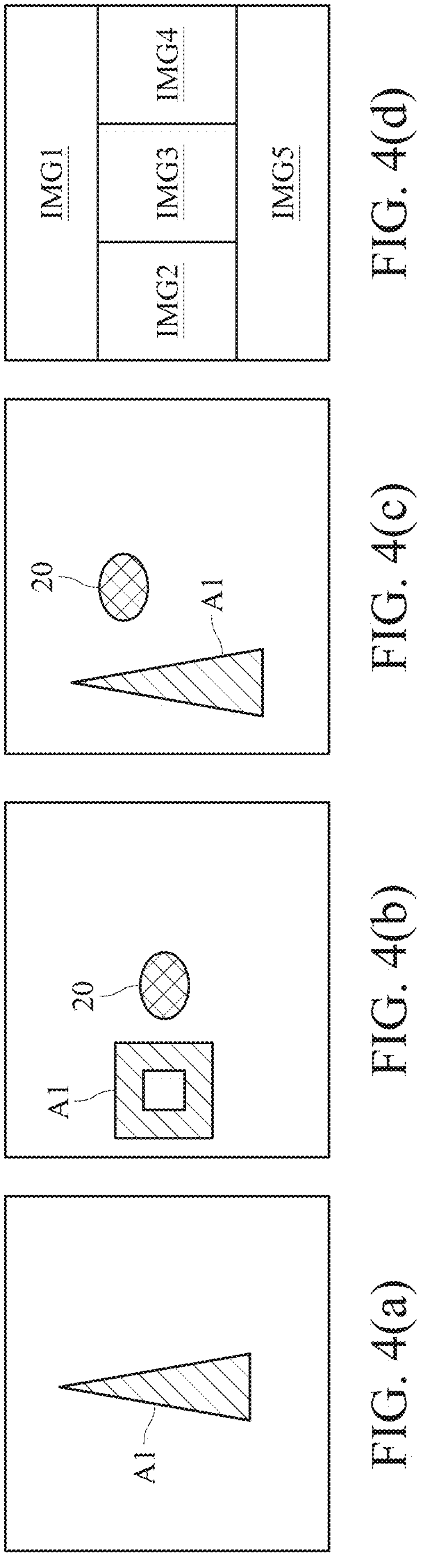
FIG. 4(*a*) to FIG. 4(*c*) are schematic diagrams illustrating sub-images corresponding to different fields of view, FIG. 4(*d*) is a schematic diagram illustrating a first environment image.

Please refer to FIG. 4(*a*) to FIG. 4(*d*), wherein FIG. 4(*a*) to FIG. 4(*c*) are schematic diagrams illustrating sub-images corresponding to different fields of view, FIG. 4(*d*) is a schematic diagram illustrating a first environment image. FIG. 4(*a*) shows a first sub-image corresponding to a first field of view, wherein the camera is disposed within the drone 20; FIG. 4(*b*) shows a second sub-image corresponding to a second field of view, wherein the camera is disposed on the outside of another drone; FIG. 4(*c*) shows a third sub-image corresponding to a third field of view, wherein the camera is disposed on the outside of the mobile vehicle. The first field of view may be the front view of the drone 20, the second field of view may be the top view of said another drone, and the third field of view may be the front view of the mobile vehicle. The first environment image shown in FIG. 4(*d*) may be an image generated by the computing device deforming and splicing multiple initial images. The computing device may perform image tracking algorithm on images captured to by cameras so that each of the first sub-image to the third sub-image may present at least one of the target object A1 and the drone 20. In addition, as described above, the camera on the drone 20 may be a depth camera, and the computing device may determine depth information corresponding to the first sub-image through the camera; further, the computing device may perform image recognition on the second sub-image and the third sub-image to determine the distance between the drone 20 and the target object A1.

As shown in FIG. 4(*d*), the first environment image displayed by the display device may include the first sub-image IMG1 to the fifth sub-image IMG5. For example, the first sub-image IMG1 may be the first sub-image as shown in FIG. 4(*a*), the second sub-image IMG2 may be the second sub-image as shown in FIG. 4(*b*), the third sub-image IMG3 may be the third sub-image as shown in FIG. 4(*c*), the fourth sub-image IMG4 may be an image corresponding to the front view, and the fifth sub-image IMG5 may be an image corresponding to the rear view. The example of the first sub-image IMG1 to the fifth sub-image IMG5 are merely examples, the present disclosure does not limit the field of view of each sub-image and the arrangement position of each sub-image in the first environment image.

In addition, more than one of the first sub-image IMG1 to the fifth sub-image IMG5 may also be images captured by multiple cameras in multiple directions. For example, said multiple directions may include front view, rear view, right view, left view, top view and bottom view of the camera.

Figure 5:
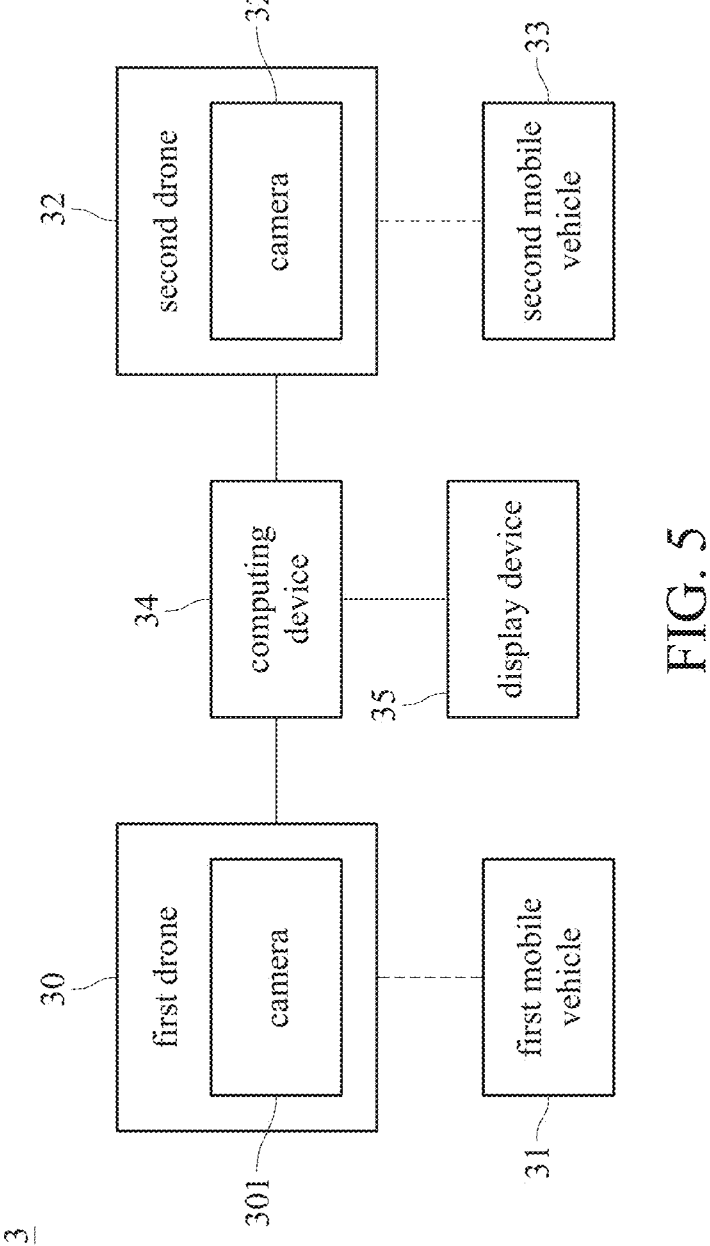
FIG. 5 is a block diagram illustrating a drone monitoring and control system according to yet another embodiment of the present disclosure.

Please refer to FIG. 5, wherein FIG. 5 is a block diagram illustrating a drone monitoring and control system according to yet another embodiment of the present disclosure. As shown in FIG. 5, the drone monitoring and control system 3 includes a first drone 30, a first mobile vehicle 31, a second drone 32, a second mobile vehicle 33, a computing device 34 and a display device 35. The computing device 34 is connected to the first drone 30, the second drone 32 and the display device 35. The computing device 34 and the display device 35 may be the same as the computing device 12 and the display device 13 shown in FIG. 1 and FIG. 2, respectively, their details are not repeated herein.

The first mobile vehicle 31 is configured to carry the first drone 30, and the second mobile vehicle 33 is configured to carry the second drone 32. The first drone 30 is disposed with a camera 301, and the second drone 32 is disposed with a camera 321. The first drone 30 and the second drone 32 may be the same as the drone 10 shown in FIG. 1 and FIG. 2, and the cameras 301 and 321 may be the same as the camera 101 shown in FIG. 1 and FIG. 2.

The computing device 34 may be configured to control the second drone 32 to perform the output operation of the first drone 30 when determining the operation payload of the first drone 30 among the first drone 30 and the second drone 32 is lower than a preset payload.

Specifically, the computing device 34 may collect the status information of all operating drones, including the amount of the operation payload remained, the remaining power and flight trajectory etc., and plan the output operation of each operation again according to the collected information. For example, when the computing device 34 determines that the operation payload of the first drone 30 is lower than the preset payload, the operation payload of the second drone 32 is not lower than the preset payload, and the operation payload of the second drone 32 is enough to continue at least a portion of the remaining output operation of the first drone 30, the computing device 34 may control the first drone 30 to return to the first mobile vehicle 31 to refill the operation payload of the first drone 30, and control the second drone 32 to take over the remaining output operation of the first drone 30.

In addition, the computing device 34 may also be configured to control the second drone 32 to perform the output operation of the first drone 30 when determining the power of the first drone 30 among the first drone 30 and the second drone 32 is lower than preset power. Similarly, when the computing device 34 determines that the power of the first drone 30 is lower than the preset power, the power of the second drone 32 is not lower than the preset power and is enough to take over at least a portion of the remaining output operation of the first drone 30, the computing device 34 may control the first drone 30 to return to the first mobile vehicle 31 to charge the first drone 30, and control the second drone 32 to take over the remaining output operation of the first drone 30.

Figure 6:
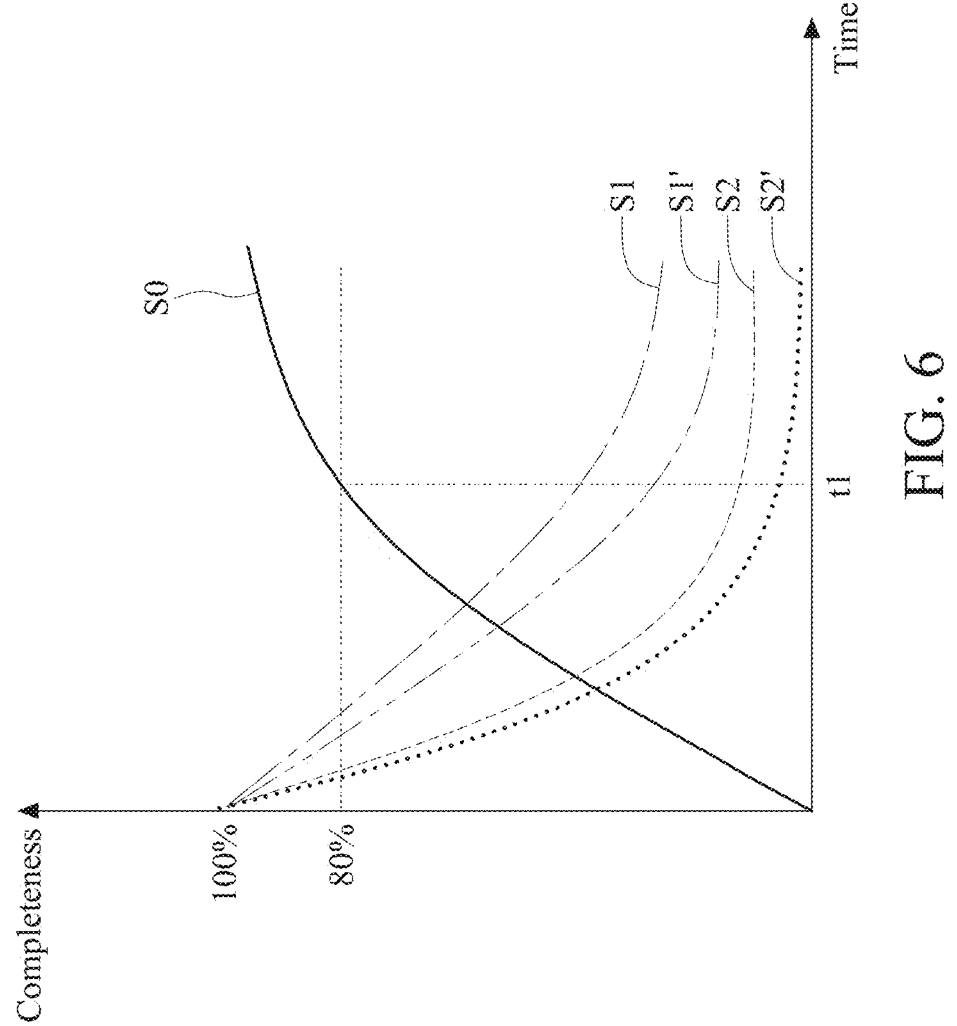
FIG. 6 is a schematic curve diagram for determining whether to control drone cooperation according to an embodiment of the present disclosure.

Please refer to FIG. 5 and FIG. 6, wherein FIG. 6 is a schematic curve diagram for determining whether to control drone cooperation according to an embodiment of the present disclosure. FIG. 6 illustrates the operation status of the first drone 30. According to FIG. 6, the computing device 34 may use the differences between the planned amounts and the actual mounts of the operation payload and the power as well as the degree of completion of the output operation to determine whether to control the second drone 32 to take over the remaining output operation of the first drone 30.

In FIG. 6, curve S0 represents the degree of completion of the output operation, curve S1 represents planned power usage, curve S1' represents actual power usage, curve S2 represents planned operation payload usage, and curve S2' represents actual operation payload usage.

Take time point t1 as an example, when the difference between curve S1 and curve S1' is greater than a default value, and the computing device 34 determines that the power of the first drone 30 is not enough to finish the remaining output operation, the computing device 34 may determine whether to control the second drone 32 to take over the remaining output operation of the first drone 30 according to the remaining power of the second drone 32.

Also take time point t1 as an example, when the difference between curve S2 and curve S2' is greater than the default value, and the computing device 34 determines that the operation payload of the first drone 30 is not enough to finish the remaining output operation, the computing device 34 may determine whether to control the second drone 32 to take over the remaining output operation of the first drone 30 according to the remaining operation payload of the second drone 32.

The numbers of the mobile vehicles and the drones shown in FIG. 5 are merely an example, the numbers of the mobile vehicles and the drones may be more than two, and the number of the drones may be different from the number of the mobile vehicles, the present disclosure is not limited thereto.

For example, the number of the target object may be three, and the three target locations are all far away from the road, which causes the drones to have longer flying distances. Therefore, the computing device may calculate that one mobile vehicle needs to carry two drones to perform the output operation. In another embodiment, the number of the target object is four, and the four target locations are all close to the road, which causes the drones to have shorter flying distances. Therefore, the computing device may calculate that one mobile vehicle needs to carry three drones to perform the output operation. Further, in the example of one mobile vehicle arranged with multiple drones, the default takeoff locations of the drones may be the same with each other or different from each other, and the default landing locations of the drones may be the same with each other or different from each other.

In view of the above, the drone monitoring and control system according to one or more embodiments of the present disclosure, the work efficiency may be improved and manpower may be reduced. Further, the drone monitoring and control system may plan the output operation based on data of the spatial information of the output operation and the durability of the drone etc., including planning the drone's flight trajectory, number of flights, replenishment timing of the operating payload and number of times of replacing battery, etc.

What is claimed is:

1. A drone monitoring and control system, comprising:

a plurality of drones each disposed with an operation payload and at least one camera, the at least one camera configured to capture a first image, and each of the plurality of drones configured to perform an output operation of the operation payload;

a plurality of mobile vehicles configured to carry the plurality of drones, respectively;

a computing device connected to the plurality of drones, the computing device configured to output a first environment image according to the first image captured by the at least one camera, and generate a flight trajectory of each of the plurality of drones and a movement trajectory of each of the plurality of mobile vehicles according to an operation data set corresponding to the output operation, wherein the operation data set comprises a target location of a target object and three-dimensional terrain data of the target location, and the computing device is further configured to control each of the plurality of drones to move to a set location according to the flight trajectory, and control each of the plurality of drones to stay at the set location when a distance between the target location and the set location is less than a preset distance; and a display device connected to the computing device, the display device configured to display the first environment image and the three-dimensional terrain data, wherein the preset distance is smaller than a height of the target object; or wherein the height of the target object is smaller than a preset height, and the preset distance is not smaller than the height of the target object, wherein the computing device is further configured to control a first drone among the plurality of drones to take over the remaining output operation of a second drone among the plurality of drones when a difference between actual power usage at a first time point and planned power usage at the first time point of the second drone is greater than a default value, or when a difference between actual operation payload usage at a second time point and planned operation payload usage at the second time point of the second drone is greater than a default value.

2. The drone monitoring and control system according to claim 1, wherein the at least one camera is a plurality of cameras respectively disposed at different locations of each of the plurality of drones, the plurality of cameras are configured to obtain a plurality of initial images, respectively, and the computing device is further configured to generate a plurality of sub-images corresponding to different fields of view based on the plurality of initial images, and combine the plurality of sub-images into the first environment image.

3. The drone monitoring and control system according to claim 1, wherein the computing device is further configured to perform image recognition on the first image captured by the at least one camera to obtain a target object image, and determine the distance between the target location and the set location according to the target object image and a reference size of the target object.

4. The drone monitoring and control system according to claim 1, wherein the operation data set further comprises at least one of a type of the target object, a plurality of candidate parking locations of each of the plurality of mobile vehicles, an available flight duration of each of the plurality of drones, a current wind direction and a current wind speed at the target location, and a default operation duration of the target object.

5. The drone monitoring and control system according to claim 4, wherein the computing device is further configured to generate at least one of an operation process corresponding to the output operation of each of the plurality of drones, a shortest flight duration of each of the plurality of drones, a take-off location and a landing location of each of the plurality of drones, replenishment timing of the operation payload, charging time of each of the plurality of drones and number of charging cycles of each of the plurality of drones according to the operation data set.

6. The drone monitoring and control system according to claim 1, wherein the computing device performs at least one of a particle swarm optimization algorithm, a genetic algorithm and an ant colony optimization algorithm on the operation data set to generate the flight trajectory and the movement trajectory.

7. The drone monitoring and control system according to claim 5, wherein the computing device performs at least one of a particle swarm optimization algorithm, a genetic algorithm and an ant colony optimization algorithm on the operation data set to generate the at least one of the operation process corresponding to the output operation of each of the plurality of drones, the shortest flight duration of each of the plurality of drones, the take-off location and the landing location of each of the plurality of drones, the replenishment timing of the operation payload, the charging time of each of the plurality of drones and the number of charging cycles of each of the plurality of drones.

8. The drone monitoring and control system according to claim 1, wherein the computing device is further configured to control each of the plurality of drones to perform the output operation after controlling each of the plurality of drones to stay at the set location.

9. The drone monitoring and control system according to claim 8, wherein the computing device is further configured to control the at least one camera to capture a second image before controlling one of the plurality of drones to perform the output operation, control the at least one camera to capture a third image after controlling the one of the plurality of drones to perform the output operation, and compare the second image and the third image to determine a cleanliness level of the target object.

10. The drone monitoring and control system according to claim 1, wherein the display device is further configured to display at least one of the distance between the target location and the set location, a current wind speed, a current wind direction, a current temperature and a current light direction.

* * * * *